J. H. A. WRISSENBERG.
FERROCONCRETE RIBBED CEILING.
APPLICATION FILED FEB. 1, 1910.

1,025,041.

Patented Apr. 30, 1912.

WITNES

INVENTOR
Julius Heinrich Albert Wrissenberg
BY
ATTORNEYS.

UNITED STATES PATENT OFFICE.

JULIUS HEINRICH ALBERT WRISSENBERG, OF BREMEN, GERMANY, ASSIGNOR TO THE FIRM OF GEBRÜDER BÖLKEN, EISENBETON-HOHLDECKEN-PATENTE "SYSTEM WRISSENBERG," OF BREMEN, GERMANY.

FERROCONCRETE RIBBED CEILING.

1,025,041. Specification of Letters Patent. Patented Apr. 30, 1912.

Application filed February 1, 1910. Serial No. 541,279.

*To all whom it may concern:*

Be it known that I, JULIUS HEINRICH ALBERT WRISSENBERG, a subject of the Emperor of Germany, residing at 35 Georgstrasse, Bremen, in the German Empire, have invented an Improved Ferroconcrete Ribbed Ceiling and Like Structure, of which the following is a specification.

While heretofore hollow bodies have been placed in ferro-concrete ribbed ceilings, the purpose of such hollow bodies has been different from that of the present invention, in which I arrange the hollow bodies in pairs, so as to form a permanent casing for each ferro-concrete rib so that fillings of sound-deadening material may be placed between consecutive pairs of the hollow bodies, and other portions of the ceiling may be formed by ramming them down upon the sound-deadening material.

The ceiling is constructed as follows: The hollow bodies I employ are of tubular form and are placed in pairs between the ribs and resting on the layer of plaster forming the plain under surface of the ceiling. The hollow bodies are secured immovably in position. By properly apportioning the intervals between the pairs of hollow bodies, the layer can be arranged for resisting strains to a remarkable extent. Moreover, in doing this it is not necessary to use hollow bodies prepared especially for each ceiling, nor is it mandatory that certain unit widths be employed in the bodies. The invention herein described, therefore, presents a wide range of adaptabilities and is applicable to any dimensions which, by calculation are found favorable, yet the invention contemplates the employment of only such building materials as may be obtained readily and cheaply almost anywhere. The spaces between the pairs of hollow bodies I fill with sound-deadening materials, so arranged as to serve as permanent supports for adjacent parts. The connection from one of the hollow bodies to the other is made in a very simple and effective manner, to wit: by clamps partially surrounding the hollow bodies and provided with an indentation for the purpose of receiving the iron insertion members.

The invention is illustrated in the accompanying drawing in which:—

Figure 1:
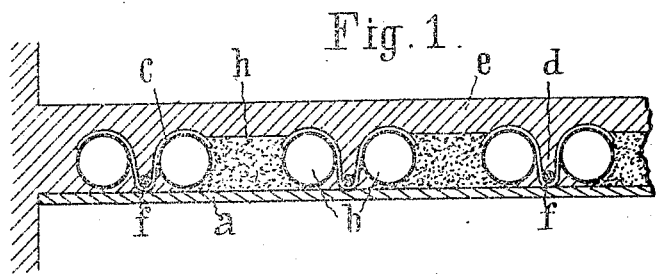
Figure 2:
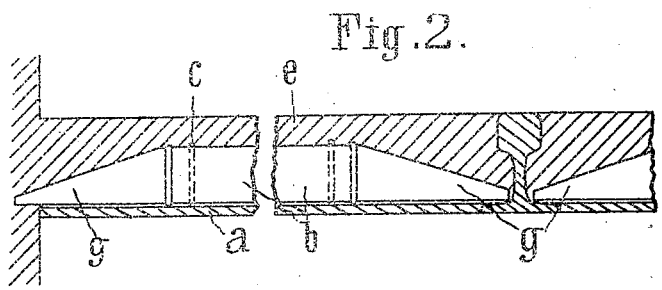
Figure 3:
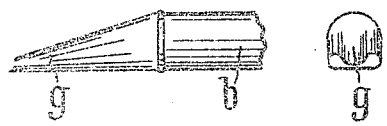
Figure 4:
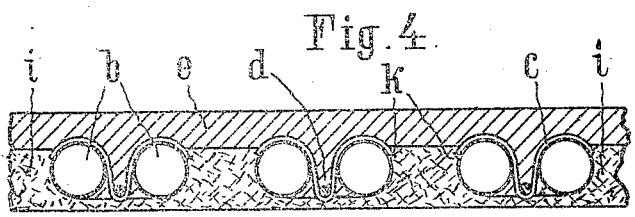

Figure 1 is a cross-section and Fig. 2 a longitudinal section of the novel ferro-concrete ribbed ceiling. Fig. 3 represents a closing strut for the tubes serving to fill the cavities, in side and end elevation. Fig. 4 is a cross section through a second constructional form of the ceiling.

A layer of cement or slag concrete $a$ is built in engagement with a casing, so as to produce a smooth under surface. Thin tubes $b$ of sheet metal or pasteboard are now arranged in pairs and laid upon the member $a$ and secured together by clamps $c$. The spaces between the pairs of tubes are apportioned according to circumstances, according to the room available between the ribs, and are filled with some suitable filling material $h$ which is a bad conductor of sound. In the spaces between the tubes of each pair, the ribs $d$ of the concrete ceiling are made by ramming the concrete. The concrete portion of the ceiling is rammed on the filling material and the ribs. The bearer members of the ceiling are therefore exclusively the ribs $d$ in conjunction with the thrust member $e$. The thin sheet metal or the like tubes are not exposed to any strains but merely to serve as an envelop for the ribs. Thin light tubes which can be extended telescopically merely by inserting them one within the other are specially adapted for this purpose; they are assembled in pairs by clamps $c$ because the pairs can be arranged at any desired intervals, while it would cause difficulties to make molded slabs of any desired width. The clamps embrace the adjacent tubes $b$ and are formed with indentations in the known manner so that they hold the spacing irons between the tubes in the statically correct position. The sheet metal or pasteboard tubes $b$ can be folded readily and at a small cost at the head ends, this arrangement presenting the advantage that the cross section of the tube becomes gradually smaller toward the head ends so that suitable reinforcements of the layer of concrete are formed at the bearing points of the ceiling plates. An important improvement is attainable by employing as the filling material a light concrete material such as slag concrete forming the entire under layer $i$ of the ceiling, which embraces the groups of tubes above by means of projecting flanges $k$ as shown in Fig. 4. The entire ceiling consists to a certain extent of a single solid mass so that there is no danger of the under layer becoming loosened. The formation of undercut grooves in the concrete ribs and similar accessory means for supporting the under layer are thus rendered entirely unnecessary.

What I claim and desire to secure by Letters Patent of the United States is:—

1. A ferro-concrete ribbed ceiling of the character described, comprising a plurality of cylindrical members disposed in pairs, the spaces between the cylindrical members of each pair being filled with concrete, a thrust member having generally the form of a plate and also made of concrete, said thrust member being integral with the concrete masses between the cylindrical members of each pair and forming a continuous plate extending from pair to pair, and a filling of lighter material disposed between one pair of cylindrical members and the next successive pair.

2. A ferro-concrete ribbed ceiling of the character described, comprising a pair of tubular members arranged in pairs, the tubular members of each pair being spaced apart by a little distance and each pair being spaced from each successive pair by a greater distance, a thrust member of concrete having generally the form of a plate extending from pair to pair of tubular members and provided with portions extending between the tubular members of each pair, fastening members for holding together the tubular members of each pair, metallic bars engaging said fastening members and also engaging said portion of said thrust member extending between the tubular members of each pair, and a filling of light material disposed between the pairs of tubular members.

3. A ferro-concrete ribbed ceiling of the character described comprising a plurality of cylindrical members each provided with conically folded ends, said members being arranged in pairs, the members of one pair being spaced from the members of the next successive pair, a thrust member made of concrete and provided with portions extending between the members of a pair, said thrust member having generally the form of a plate extending from pair to pair of tubular members, the thickness of which at predetermined points is greater than the thickness at the other points in consequence of the reduction of the ends of the cylindrical members, and a filling of light slag cement disposed between said pairs.

In testimony whereof I affix my signature in presence of two witnesses.

JULIUS HEINRICH ALBERT WEISSENBERG.

Witnesses:
  FREDERICK HOYERMANN,
  FRIEDRICH SCHMIDT.